(12) United States Patent
Nohara et al.

(10) Patent No.: US 11,274,655 B2
(45) Date of Patent: Mar. 15, 2022

(54) WIND TURBINE DRIVING DEVICE, WIND TURBINE DRIVING DEVICE UNIT, AND WIND TURBINE

(71) Applicant: NABTESCO CORPORATION, Tokyo (JP)

(72) Inventors: Osamu Nohara, Gifu (JP); Shigeru Hosoda, Gifu (JP); Yuichi Asakawa, Gifu (JP)

(73) Assignee: NABTESCO CORPORATION, Tokyo (JP)

( * ) Notice: Subject to any disclaimer, the term of this patent is extended or adjusted under 35 U.S.C. 154(b) by 365 days.

(21) Appl. No.: 16/464,126

(22) PCT Filed: Dec. 5, 2017

(86) PCT No.: PCT/JP2017/043585
§ 371 (c)(1),
(2) Date: May 24, 2019

(87) PCT Pub. No.: WO2018/105590
PCT Pub. Date: Jun. 14, 2018

(65) Prior Publication Data
US 2019/0390651 A1    Dec. 26, 2019

(30) Foreign Application Priority Data

Dec. 5, 2016 (JP) .............................. JP2016-236190

(51) Int. Cl.
*F03D 7/04*    (2006.01)
*F03D 17/00*   (2016.01)
*G01L 5/24*    (2006.01)

(52) U.S. Cl.
CPC ............... *F03D 7/04* (2013.01); *F03D 17/00* (2016.05); *G01L 5/24* (2013.01); *F05B 2270/1095* (2013.01); *F05B 2270/808* (2013.01)

(58) Field of Classification Search
CPC . F03D 7/04; F03D 7/042; F03D 17/00; F03D 80/80; F03D 80/82; F03D 80/88;
(Continued)

(56) References Cited

U.S. PATENT DOCUMENTS 9,869,298 B2 * 1/2018 Rosenvard ............... F03D 7/04
2010/0052320 A1   3/2010 Hoffmann
(Continued)

FOREIGN PATENT DOCUMENTS

CN   2890870 Y      4/2007
JP   02-303752 A   12/1990
(Continued)

OTHER PUBLICATIONS

Office Action dated May 21, 2021, issued in corresponding Japanese Patent Application No. 2016-236190 with English language machine translation (13 pgs.).

(Continued)

*Primary Examiner* — Brian P Wolcott
*Assistant Examiner* — Sang K Kim
(74) *Attorney, Agent, or Firm* — Pillsbury Winthrop Shaw Pittman, LLP

(57) ABSTRACT

One object is to promptly and accurately sense an abnormal state of a wind turbine driving device. The wind turbine driving device includes a driving device body and a sensor. The driving device body is installed in one structure at a movable section of a wind turbine. The driving device body includes a meshing portion meshing with a ring gear installed in the other structure at the movable section of the (Continued)

wind turbine. The sensor measures a change in installation state of the driving device body with respect to the one structure.

14 Claims, 12 Drawing Sheets

(58) Field of Classification Search
CPC ....... F05B 2270/1095; F05B 2270/808; G01L 5/24
See application file for complete search history.

(56) References Cited

U.S. PATENT DOCUMENTS

| | | | | |
|---|---|---|---|---|
| 2010/0135808 | A1* | 6/2010 | Wiebrock | F03D 7/0224 416/155 |
| 2011/0254282 | A1* | 10/2011 | Lim | E04H 12/085 290/55 |
| 2011/0318178 | A1* | 12/2011 | Andersen | F03D 7/0204 416/1 |
| 2012/0134809 | A1* | 5/2012 | Bagepalli | F03D 1/0658 416/1 |
| 2017/0096984 | A1* | 4/2017 | Kacmarcik | F16C 19/522 |

FOREIGN PATENT DOCUMENTS

| | | |
|---|---|---|
| JP | 11-241942 A | 9/1999 |
| JP | 2001-289149 A | 10/2001 |
| JP | 2003-083824 A | 3/2003 |
| JP | 2003-113769 A | 4/2003 |
| JP | 2014-010015 A | 1/2014 |
| JP | 2016-123848 A | 7/2016 |
| WO | 2013/132156 A1 | 9/2013 |
| WO | 2016/108266 A1 | 7/2016 |
| WO | 2016/181729 A1 | 11/2016 |

OTHER PUBLICATIONS

First Office Action dated Jul. 3, 2020 issued in corresponding Chinese Patent Application No. 201780072336.0 with English translation (20 pgs.).
English translation International Preliminary Report on Patentability and Written Opinion of the International Searching Authority PCT/JP2017/043585 dated Jun. 11, 2019.
Extended European Search Report dated Jun. 5, 2020 issued in corresponding European Patent Application No. 17879611.6 (8 pgs.).
Notice of Reasons for Refusal dated Oct. 20, 2020 issued in corresponding Japanese Patent Application No. 2016-236190 with English translation (10 pgs.).
International Search Report dated Mar. 6, 2018 issued in corresponding International Patent Application No. PCT/JP2017/043585 with English translation.

\* cited by examiner

WIND TURBINE DRIVING DEVICE, WIND TURBINE DRIVING DEVICE UNIT, AND WIND TURBINE

CROSS-REFERENCE TO RELATED APPLICATIONS

This Application is the U.S. National Stage of PCT/JP2017/043585, filed Dec. 5, 2017, which claims priority to Japanese Patent Application No. 2016-236190 filed Dec. 5, 2016. The contents of each of which is incorporated herein by reference in its entirety.

TECHNICAL FIELD

The present invention relates to a wind turbine driving device and a wind turbine driving device unit used for a movable section of a wind turbine, and the wind turbine.

BACKGROUND

A wind turbine used as a wind power generator has been known as disclosed in, for example, Patent Literature 1. The wind turbine includes a nacelle rotatably installed at the top of a tower and including a generator and the like disposed therein, and a blade installed rotatably relative to a rotor (hub, main shaft portion) attached to the nacelle. The wind turbine has, for example, a yaw or pitch driving device as a wind turbine driving device for rotationally driving one structure relative to the other structure at a movable section of the wind turbine. The yaw driving device drives the nacelle, which is the one structure, to rotate relative to the tower, which is the other structure, so as to turn the nacelle depending on a wind direction. The pitch driving device drives a shaft portion of the blade, which is the one structure, to rotate relative to the rotor in the nacelle, which is the other structure, so as to adjust a pitch angle of the blade.

RELEVANT REFERENCES

List of Relevant Patent Literature

Patent Literature 1: Japanese Patent Application Publication No. 2001-289149

SUMMARY

Typically, a plurality of wind turbine driving devices are provided with respect to one movable section of a wind turbine. In this wind turbine, it is even expected that, due to some abnormality, an output shaft of one of the plurality of wind turbine driving devices provided in the one movable section might be undesirably maintained in a fixed state. In such an abnormal situation, the thus fixed output shaft of the malfunctioning one of the wind turbine driving devices meshes with a ring gear, bringing the movable section into a locked state. In the locked state, when the other normally functioning wind turbine driving devices operate, damage might occur to either the wind turbine driving devices or the ring gear. In a case where damage has occurred to any one of the wind turbine driving devices, the any one of the wind turbine driving devices is replaced, and thus the wind turbine can be brought into operation again. On the other hand, in a case where breakage has occurred in the ring gear or an area surrounding the ring gear in a structure, large-scale repair work might be required, resulting in stopping an operation of the wind turbine for a long period of time. To avoid such trouble, it is important to promptly and accurately sense an abnormal state of a wind turbine driving device. That is, in view of these circumstances, it is an object of the present invention to promptly and accurately sense an abnormal state of a wind turbine driving device.

A wind turbine driving device according to the present invention includes a driving device body installed in one structure at a movable section of a wind turbine and including a meshing portion meshing with a ring gear installed in another structure at the movable section of the wind turbine, and a sensor for measuring a load acting between the driving device body and the one structure.

The wind turbine driving device according to the present invention may further include a load avoidance unit for stopping an operation of the driving device body based on a signal from the sensor.

In the wind turbine driving device according to the present invention, the sensor may measure an instantaneous change in installation state, the instantaneous change continuing for one second or less.

In the wind turbine driving device according to the present invention, it is possible that the driving device body is fixed to the one structure with a fastening bolt, the sensor includes a force receiving part for receiving a load acting on the driving device body and a sensing portion for measuring a strain of the force receiving part, the sensing portion being provided on the force receiving part, and the force receiving part is formed of a sensing pin smaller in diameter than the fastening bolt.

In the wind turbine driving device according to the present invention, it is possible that the driving device body is fixed to the one structure with a fastening bolt, the sensor includes a force receiving part for receiving a load acting on the driving device body and a sensing portion for measuring a strain of the force receiving part, the sensing portion being provided on the force receiving part, and the force receiving part is made of a material having an elastic modulus smaller than that of a material of the fastening bolt.

In the wind turbine driving device according to the present invention, it is possible that the sensor includes a force receiving part for receiving a load acting on the driving device body and a sensing portion for measuring a strain of the force receiving part, the sensing portion being provided on the force receiving part, and the force receiving part and the sensing portion are made of a same material.

In the wind turbine driving device according to the present invention, it is possible that the driving device body is fixed to the one structure with a fastening bolt, the sensor includes a force receiving part for receiving a load acting on the driving device body and a sensing portion for measuring a strain of the force receiving part, the sensing portion being provided on the force receiving part, and the force receiving part fixes the driving device body to the one structure with an axial force smaller than that of the fastening bolt.

In the wind turbine driving device according to the present invention, it is possible that the driving device body is fixed to the one structure with a fastening bolt, the sensor includes a force receiving part for receiving a load acting on the driving device body and a sensing portion for measuring a strain of the force receiving part, the sensing portion being provided on the force receiving part, and the force receiving part is formed of a mounting plate extending between the driving device body and the one structure.

In the wind turbine driving device according to the present invention, it is possible that the sensor includes a force receiving part for receiving a load acting on the driving device body and a sensing portion for measuring a strain of the force receiving part, the sensing portion being provided on the force receiving part, and the force receiving part is formed of a sensing pin, and the sensing pin is bolt-fastened to the driving device body and the one structure.

In the wind turbine driving device according to the present invention, it is possible that the sensor includes a force receiving part for receiving a load acting on the driving device body and a sensing portion for measuring a strain of the force receiving part, the sensing portion being provided on the force receiving part, and the force receiving part is fixed to the driving device body and the one structure by welding.

In the wind turbine driving device according to the present invention, it is possible that the sensor includes a force receiving part for receiving a load acting on the driving device body and a sensing portion for measuring a strain of the force receiving part, the sensing portion being provided on the force receiving part, and the force receiving part is formed of a sensing pin provided in a shaft, the shaft extending between the driving device body and the one structure and having a hole.

In the wind turbine driving device according to the present invention, it is possible that the sensor includes a force receiving part for receiving a load acting on the driving device body and a sensing portion for measuring a strain of the force receiving part, the sensing portion being provided on the force receiving part, and the force receiving part is formed of a clamp for clamping together the driving device body and the one structure.

In the wind turbine driving device according to the present invention, the sensor may be formed of a strain gauge attached to the driving device body and the one structure.

It is possible that a wind turbine driving device unit according to the present invention includes a plurality of wind turbine driving devices provided in one movable section of a wind turbine, wherein each of the plurality of wind turbine driving devices is formed of any one of the above-mentioned wind turbine driving devices according to the present invention, and each of the plurality of wind turbine driving devices separately includes the sensor for measuring a load acting between the driving device body and the one structure.

A wind turbine according to the present invention includes any one of the above-mentioned wind turbine driving devices according to the present invention or the above-mentioned wind turbine driving device unit according to the present invention.

Advantages

According to the present invention, it is possible to promptly and accurately sense an abnormal state of a wind turbine driving device.

DESCRIPTION OF EXAMPLE EMBODIMENTS

Embodiment

Figure 1:
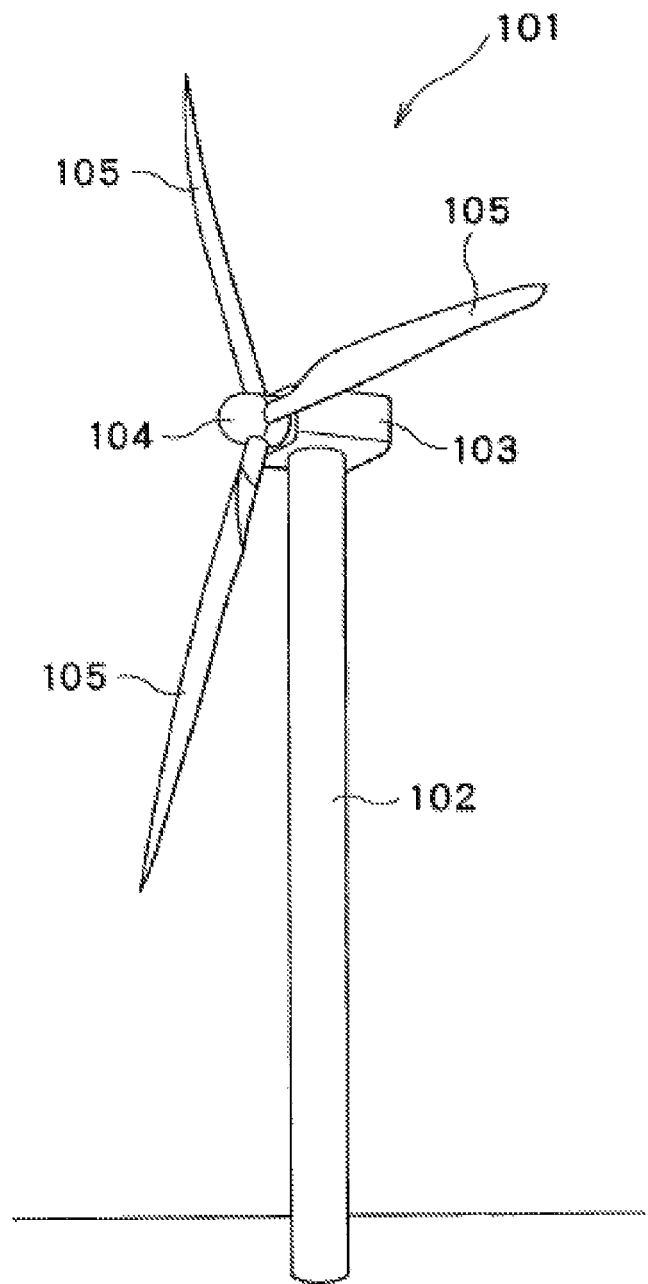
FIG. 1 is a perspective view showing a wind turbine for explaining one embodiment of the present invention.

One embodiment of the present invention will be hereinafter described with reference to the appended drawings. In the drawings appended hereto, for the sake of convenience of illustration and ease of understanding, a scale size, an aspect ratio, and the like are altered as appropriate from those of real things for emphasis.

FIGS. 1 to 7 are drawings for describing one embodiment according to the present invention. A wind turbine driving device 10 described herein drives a nacelle 103 installed rotatably relative to a tower 102 of a wind turbine 101 or a blade 105 installed rockably in a pitch direction relative to a rotor 104 mounted to the nacelle 103. That is, the wind turbine driving device 10 described herein can be used as a yaw driving device for performing yaw driving so as to rotate the nacelle 103 relative to the tower 102 of the wind turbine 101 and also as a pitch driving device for performing pitch driving so as to rotate a shaft portion of the blade 105 relative to the rotor 104 in the nacelle 103. In an example shown, which will be described below, a wind turbine driving device functions as the yaw driving device.

As shown in FIG. 1, the wind turbine 101 includes the tower 102, the nacelle 103, the rotor 104 that is a main shaft portion, the blade 105, and the like. The tower 102 is installed such that it extends vertically upward from the ground. The nacelle 103 is installed on the top of the tower 102 so as to be rotatable relative thereto. Rotation of the nacelle 103 relative to the tower 102 is so-called yaw rotation about a longitudinal direction of the tower 102. The nacelle 103 is driven by the wind turbine driving device 10, which will be described later in detail, to rotate relative to the tower 102. A power transmission shaft, a generator, and the like are disposed inside the nacelle 103. The rotor 104 is connected to the power transmission shaft and is rotatable relative to the nacelle 103. A plurality of blades 105 (three blades 105 in the example shown in FIG. 1) are provided. The blades 105 extend from the rotor 104 in a radial direction about a rotation axis of the rotor 104 relative to the nacelle 103. The plurality of blades 105 are arranged at equal angular intervals.

Each of the blades 105 is rotatable in the pitch direction, in other words, rotatable about a longitudinal direction thereof relative to the rotor 104. That is, a connection section of the blades 105 to the rotor 104 is configured as a movable section. The blades 105 are driven to rotate by a wind turbine driving device provided as the pitch driving device. The wind turbine driving device as the pitch driving device is configured similarly to the after-mentioned wind turbine driving device 10 as the yaw driving device.

Figure 2:
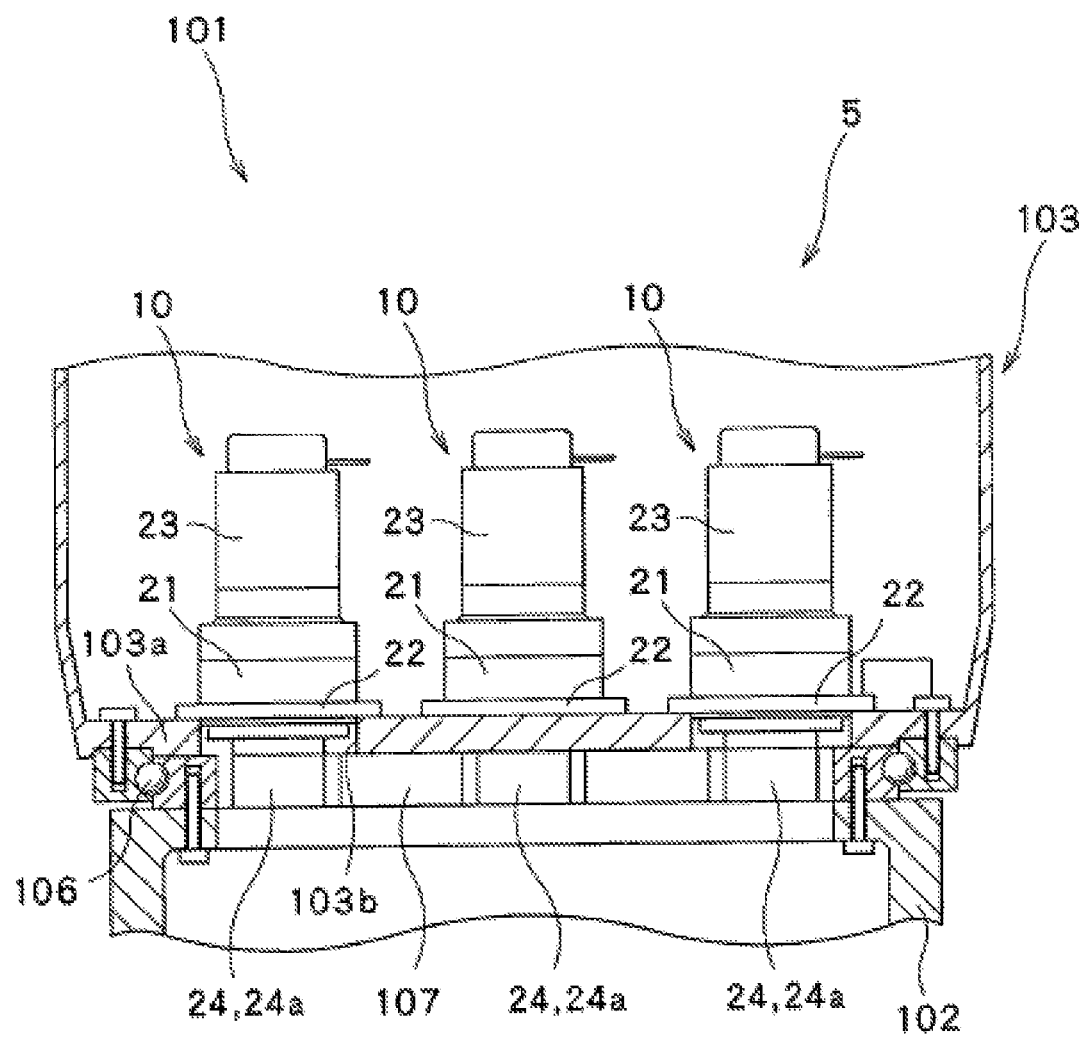
FIG. 2 is a longitudinal sectional view of the wind turbine shown in FIG. 1, which shows a movable section between a tower and a nacelle.

FIG. 2 is an enlarged longitudinal sectional view of a portion of the wind turbine 10, in which the nacelle 103 is installed rotatably relative to the tower 102. In FIG. 2, the wind turbine driving device 10 is shown not in longitudinal sectional view but in outside view. The nacelle 103 is installed on the top of the tower 102 so as to be rotatable relative thereto via a bearing 106 interposed between a bottom portion 103a of the nacelle 103 and the tower 102. A ring gear 107 having internal teeth formed on its inner periphery is fixed to the top of the tower 102. Note that teeth of the ring gear 107 are not necessarily provided on the inner periphery of the ring gear 107 and may be alternatively provided on an outer periphery thereof. In the drawings, the internal teeth of the ring gear 107 are not shown.

Figure 3:
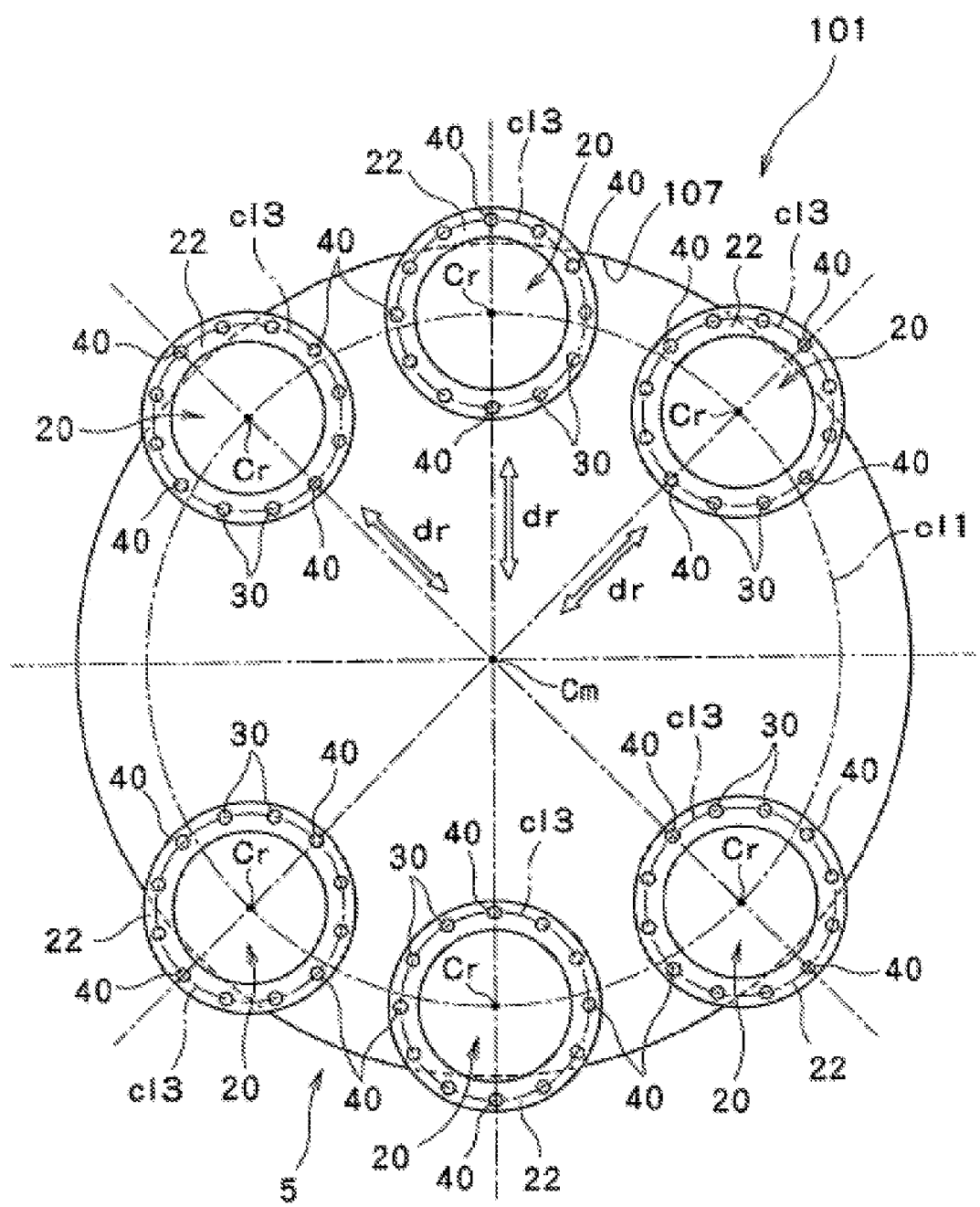
FIG. 3 is a plan view showing an arrangement of wind turbine driving devices in the movable section shown in FIG. 2.

As shown in FIG. 2 and FIG. 3, a plurality of wind turbine driving devices 10 are mounted in the nacelle 103. The wind turbine driving devices 10 each include a meshing portion 24a meshing with the internal teeth of the ring gear 10. By driving the wind turbine driving devices 10, it is possible to rotate the nacelle 103, which is one side of the movable section of the wind turbine 101, relative to the tower 102, which is the other side of the movable section of the wind turbine 101. As shown in FIG. 3, the ring gear 107 is formed in a circumferential shape and has a center axis Cm. The nacelle 103 rotates about the center axis Cm of the ring gear 107. In the example shown, the center axis Cm of the ring gear 107 agrees with the longitudinal direction of the tower 102. In the following description, a direction parallel to the center axis Cm of the ring gear 107 is simply referred to also as an "axial direction dl."

In the wind turbine 101 shown, as shown in FIG. 3, a pair of wind turbine driving device units 5 are provided. The pair of wind turbine driving device units 5 are arranged in rotational symmetry about the center axis Cm of the ring gear 107. Each of the wind turbine driving device units 5 includes three wind turbine driving devices 10. Six driving device bodies 20 in total included in the pair of wind turbine driving device units 5 are provided along a circumference Cm (see FIG. 3) about the center axis Cm of the ring gear 107. The three wind turbine driving devices 10 included in each of the wind turbine driving device units 5 are arranged sequentially at given intervals along the circumference cl1.

The wind turbine driving devices 10 each have the driving device body 20 fixed to the nacelle 103 and a fastener 30 for fixing the driving device body 20 to the nacelle 103. Moreover, the wind turbine driving devices 10 described herein each include a sensor 40 for finding any abnormality in the driving device body 20. The sensor 40 is provided as a separate body from the fastener 30 and measures a load acting between the nacelle 103 and the driving device body 20. As will be described later, through the use of the sensor 40, it becomes possible to promptly and accurately sense a load acting between the nacelle 103 and the driving device body 20. The following describes constituent elements of each of the wind turbine driving devices 10.

Figure 4:
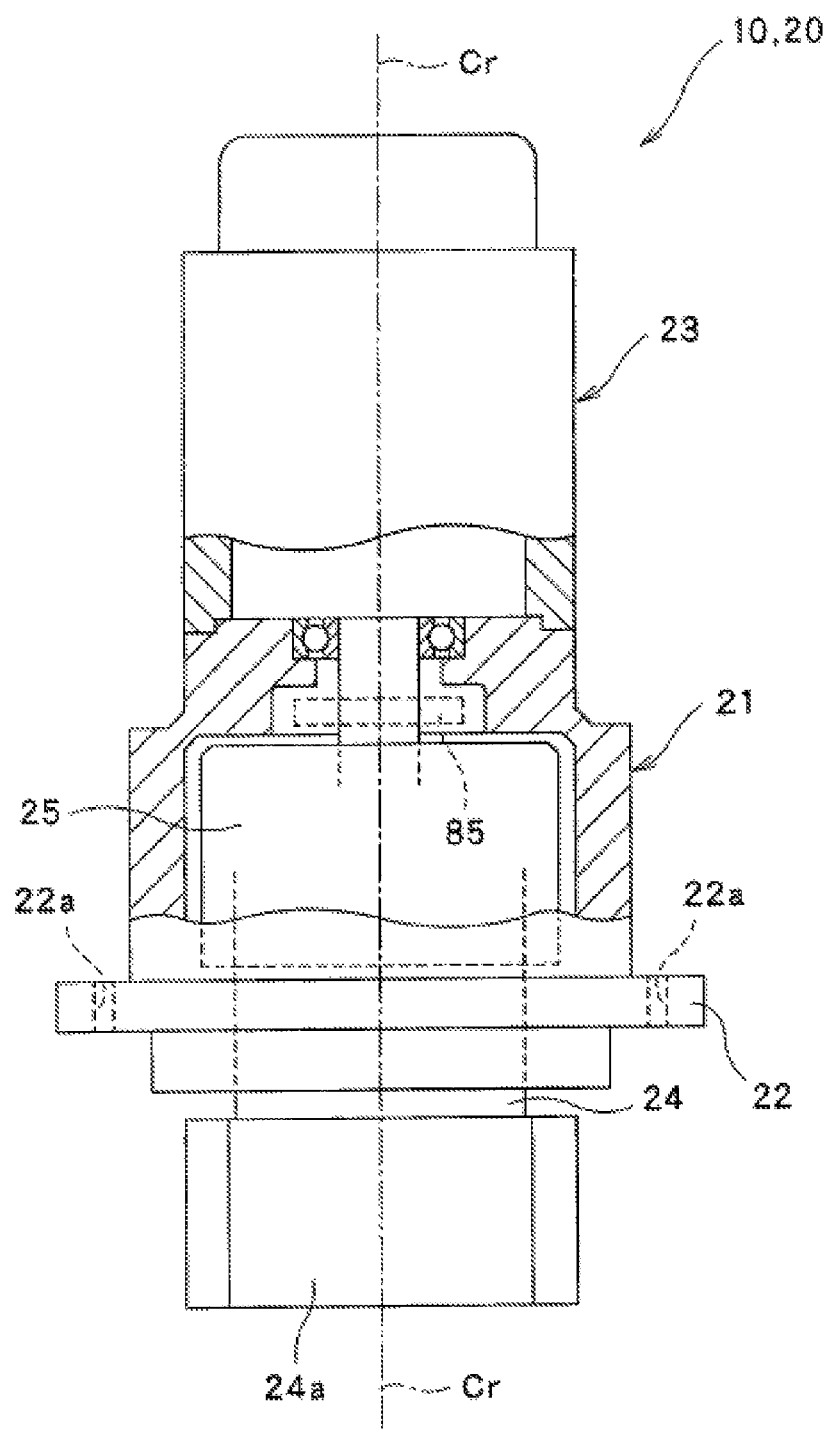
FIG. 4 is a view of one of the wind turbine driving devices shown in FIG. 2, part of which is shown in longitudinal section.

First, the driving device body 20 will be now described. As shown in FIG. 4, the driving device body 20 includes an output shaft 24 having the meshing portion 24a meshing with the ring gear 107, a case 21 rotatably retaining the output shaft 24, and an electric motor 23 fixed to the case 21. The driving device body 20 further includes a connection portion 25 connecting the electric motor 23 to the output shaft 24. The connection portion 25 is housed in the case 21. As one example, the connection portion 25 decelerates an input from the electric motor 23 and transmits the decelerated input to the output shaft 24. The connection portion 25 described above can adopt an eccentric oscillating gear-type speed reducing mechanism, a planetary gear-type speed reducing mechanism, or a speed reducing mechanism combining the eccentric oscillating gear-type and the planetary gear-type.

Figure 5:
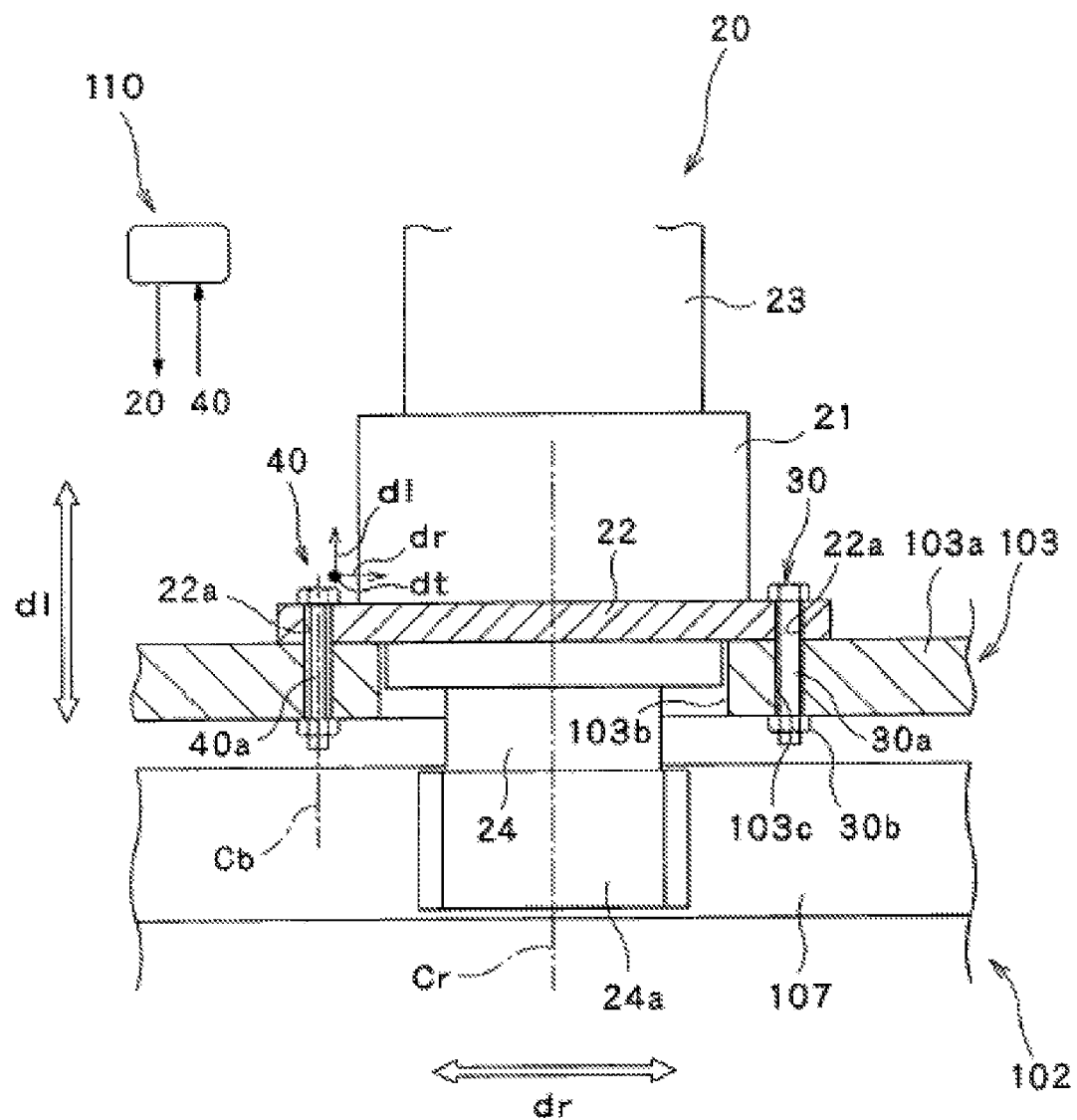
FIG. 5 is a view of a mounting part of the one of the wind turbine driving devices shown in FIG. 4, part of which is shown in longitudinal section.

As shown in FIG. 4, an end portion of the output shaft 24 distal from the connection portion 25 extends out from the case 21. The meshing portion 24a is formed at a portion of the output shaft 24, the part extending out from the case 21. As shown in FIG. 2 and FIG. 5, the meshing portion 24a of the output shaft 24 extends into a through hole 103b formed through the bottom portion 103a of the nacelle 103 and meshes with the ring gear 107. The meshing portion 24a is formed in a shape adapted to the ring gear 107. As one example, the meshing portion 24a forms a pinion gear having external teeth configured to mesh with the internal teeth of the ring gear 107. The wind turbine driving devices 10 each have a longitudinal axis corresponding to a rotation axis Cr of the output shaft 24. In a state where each of the wind turbine driving devices 10 is fixed to the nacelle 103, the rotation axis Cr of the output shaft 24 is parallel to the axial direction dl of the wind turbine 101.

Next, the case 21 will be now described. As shown in FIG. 4, the case 21 is formed in a cylindrical shape. As shown in FIG. 5, the case 21 is disposed so that a longitudinal axis thereof is positioned on the rotation axis Cr. The case 21 is open at both ends thereof along the rotation axis Cr.

The meshing portion 24a of the output shaft 24 is exposed from an opening of the case 21 near the tower 102. The electric motor 23 is mounted to an opening of the case 21 on an opposite side to the tower 102. Furthermore, the case 21 includes a flange 22. As shown in FIG. 3, the flange 22 is formed in an annular shape and extends along a circumference cl3 about the rotation axis Cr of the output shaft 24. As shown in FIG. 4 and FIG. 5, a through hole 22a is formed through the flange 22. A multitude of through holes 22a are formed on a circumference about the rotation axis Cr of the output shaft 24. In the example shown, twelve through holes 22a are formed. As shown in FIG. 4 and FIG. 5, the through holes 22a extend in the axial direction dl.

Next, the fastener 30 will now be described. The fastener 30 is used to fix the driving device body 20 configured as above to the nacelle 103. The fastener 30 penetrates through the flange 22 by extending through the through holes 22a formed through the flange 22 of the driving device body 20. The bottom portion 103a of the nacelle 103 has a through hole 103c formed at a position facing each of the through holes 22a of the flange 22. The fastener 30 extends through each of the through holes 22a of the driving device body 20 and further extends into the through hole 103c of the nacelle 103. In the example shown, the fastener 30 includes a bolt 30a and a nut 30b. The bolt (fastening bolt) 30a penetrates through the driving device body 20 and the bottom portion 103a of the nacelle 103. The nut 30b is screwed on the bolt 30a from near the tower 102, the bolt 30a penetrating through the driving device body 20 and the nacelle 103 in this order. In the example shown, the through hole 103c of the nacelle 103 is formed at each of twelve locations corresponding to the through holes 22a. The fastener 30 composed of the bolt 30a and the nut 30b is provided for each of all the through holes 22a of the driving device body 20 except for four through holes 22a in total positioned at, for example, an outermost peripheral position, an innermost peripheral position, a position spaced 90° apart from the outermost peripheral position, and a position spaced 90° apart from the innermost peripheral position shown in FIG. 3. As a result, by use of eight fasteners 30, the driving device body 20 is mounted at eleven locations to the nacelle 103. Further, the sensor 40 for measuring a change in installation state of the driving device body 20 as will be described later is mounted at each of the four through holes 22a of the driving device body 20, the four through holes 22a being positioned at the outermost peripheral position, the innermost peripheral position, the position spaced 90° apart from the outermost peripheral position, and the position spaced 90° apart from the innermost peripheral position.

There is no limitation to the example shown, and instead of using the nut 30b, a female screw with which a male screw of the bolt 30a is to be screwed may be formed in the through hole 103c of the nacelle 103.

In such an example, the fastener 30 is formed of the bolt 30a, and the bolt 30a meshes with the through hole 103c of the nacelle 103, and thus the driving device body 20 can be fixed to the nacelle 103.

Figure 11:
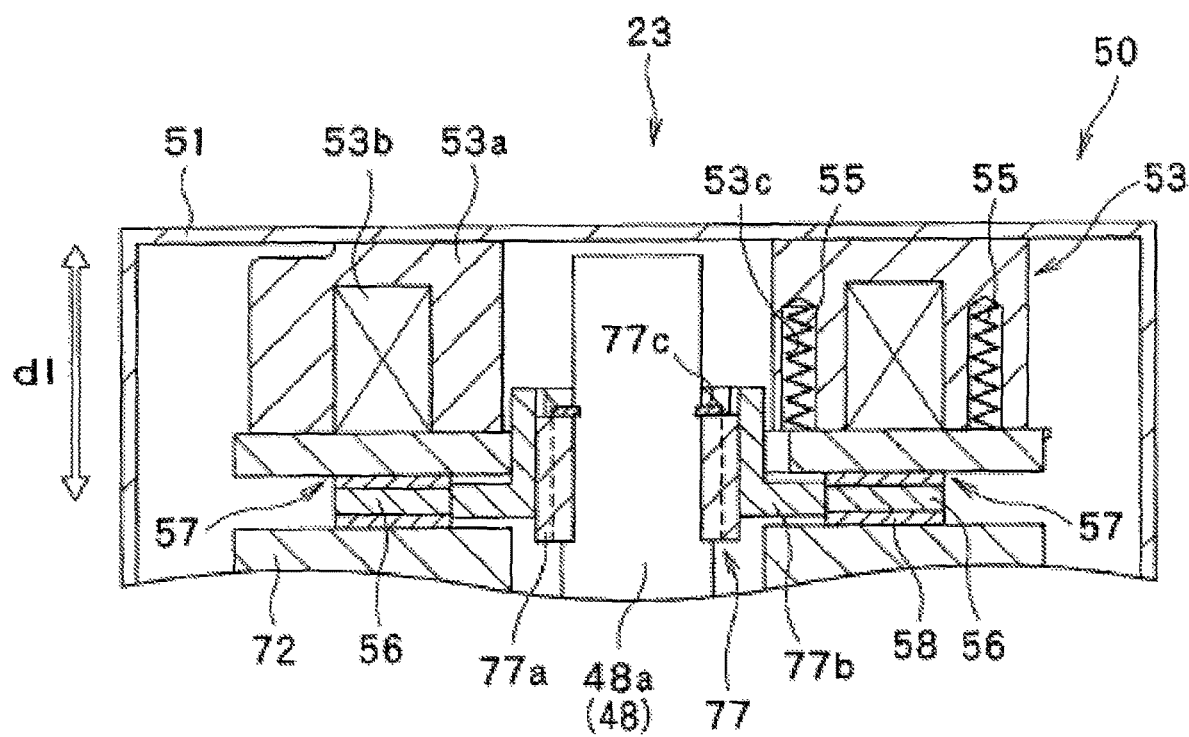
FIG. 11 is a view schematically showing a braking mechanism for braking the driving devices.

Next, the electric motor 23 will now be described. In the example shown, the electric motor 23 includes a motor driving portion 48 and a motor braking portion 50. FIG. 11 is a view schematically showing a partial longitudinal section of the electric motor 23. The motor braking portion 50 is a braking mechanism for braking rotation transmitted to a drive gear 24a. However, as will be described later, instead of or in addition to the motor braking portion 50, the driving device body 20 can include a braking mechanism in any of various forms capable of braking rotation transmitted to the drive gear 24a or rotation outputted from the drive gear 24a.

The electric motor 23 including the motor driving portion 48 and the motor braking portion (load avoidance unit) 50 is provided in each of the driving devices 10, and one motor braking portion 50 is mounted to each motor driving portion 48. The motor driving portion 48 can be formed of any device capable of controlling the number of rotations of a drive shaft 48a based on a command from a controller 110 (see FIG. 12). The motor braking portion 50 shown includes a mechanism as an electromagnetic brake for braking rotation of the drive shaft 48a of the motor driving portion 48 or releasing the drive shaft 48a from being braked, based on a command from the controller 110 (see FIG. 7). In a state where rotation of the drive shaft 48a is braked, the number of rotations of the drive shaft 48a is reduced, and thus eventually, the drive shaft 48a can be completely stopped from rotating. On the other hand, in a state where the drive shaft 48a is released from being braked, the drive shaft 48a can rotate without being braked by the motor braking portion 50, basically at a proper number of rotations corresponding to electric power supplied to the motor driving portion 48. A drive force (rotational power) from the drive shaft 48a of the motor driving portion 48 is transmitted to the output shaft 24 via the connection portion 25.

The motor braking portion 50 of this example is mounted to an end portion of a cover 72 of the motor driving portion 48 on an opposite side to a speed reducing portion 25 and includes a housing 51, a friction plate 56, an armature 57, an elastic member 55, an electromagnet 53, a first friction plate connecting portion 77, and the like. The housing 51 is a structure that houses the friction plate 56, the armature 57, the elastic member 55, the electromagnet 53, the first friction plate connecting portion 77, and the like and is fixed to the cover 72 of the motor driving portion 48. The friction plate 56 is connected to the drive shaft 48a of the motor driving portion 48 via the first friction plate connecting portion 77. The friction plate 56 has a through hole that is penetrated by one end portion of the drive shaft 48a.

The first friction plate connecting portion 77 of this example includes a spline shaft 77a and a slide shaft 77b. The spline shaft 77a is fixed to an outer periphery of the one end portion of the drive shaft 48a through key coupling via a key member (not shown) and engagement with a stopper ring 77c. The slide shaft 77b is mounted to the spline shaft 77a so as to be slidable in an axial direction. Furthermore, the first friction plate connecting portion 77 is provided with a spring mechanism (not shown) for situating the slide shaft 77b at a predetermined position in the axial direction relative to the spline shaft 77a. An inner periphery of the friction plate 56 is fixed to an edge portion of an outer periphery of a flange-shaped portion of the slide shaft 77b, so that the friction plate 56 is coupled integrally with the slide shaft 77b.

In the motor braking portion 50 having the above-described configuration, when the drive shaft 48a rotates, the spline shaft 77a, the slide shaft 77b, and the friction plate 56 also rotate together with the drive shaft 48a. In a state where the after-mentioned electromagnet 53 is excited, the slide shaft 77b and the friction plate 56 that are retained so as to be slidable in the axial direction relative to the drive shaft 48a and the spline shaft 77a are situated at a predetermined position in the axial direction of the spline shaft 77a by the spring mechanism. When disposed at this predetermined position, the friction plate 56 is separated from the armature 57 and a friction plate 58, which will be described later.

The armature 57 is contactable with the friction plate 56 and generates a braking force for braking rotation of the drive shaft 48a when contacting with the friction plate 56. Furthermore, in this example, the friction plate 58 is provided at a location on one end portion of the cover 72 of the motor driving portion 48, where the friction plate 58 is opposed to the friction plate 56. The friction plate 58 is installed at such a position as to be contactable with the friction plate 56.

The elastic member 55 is retained in an electromagnetic body 53a of the electromagnet 53, which will be described later, and biases the armature 57 in a direction from the electromagnet 53 toward the friction plate 56. Particularly in this example, the elastic member 55 in the electromagnetic body 53a includes two arrays of elastic members 55 arranged on the inner peripheral side and the outer peripheral side in the circumferential direction so as to be concentric about the drive shaft 48a. The above-mentioned form of arranging the elastic members 55 is merely an example, and the elastic members 55 may be arranged in any other form.

The electromagnet 53 includes the electromagnetic body 53a and a coil portion 53b and attracts the armature 57 by a magnetic force so as to separate the armature 57 from the friction plate 56. The electromagnetic body 53a is fixed to the housing 51, and in particular, fixed thereto at an end portion of the electromagnetic body 53a on an opposite side to where the electromagnetic body 53a is opposed to the armature 57. The electromagnetic body 53a has a plurality of elastic member retaining holes 53c open toward the armature 57, and the elastic members 55 are disposed in the elastic member retaining holes 53c, respectively. The coil portion 53b is installed inside the electromagnetic body 53a and disposed along the circumferential direction of the electromagnetic body 53a. Supplying and shutting off of an electric current to the coil portion 53b is performed based on a command of the controller 110.

For example, when the motor braking portion 50 releases the drive shaft 48*a* from being braked, an electric current is supplied to the coil portion 53*b* to energize the electromagnet 53, based on a command of the controller 110. When the electromagnet 53 is energized and thus is brought into an exited state, the armature 57 is attracted to the coil portion 53*b* by a magnetic force generated at the electromagnet 53. At this time, the armature 57 is attracted to the electromagnet 53 against an elastic force (spring force) of the plurality of elastic members 55. With this configuration, the armature 57 is separated from the friction plate 56, and thus the drive shaft 48*a* is released from being braked. Accordingly, in a state where the electromagnet 53 is excited and thus the drive shaft 48*a* is released from being braked, the armature 57 is brought into contact with the electromagnetic body 53*a*.

Figure 6:
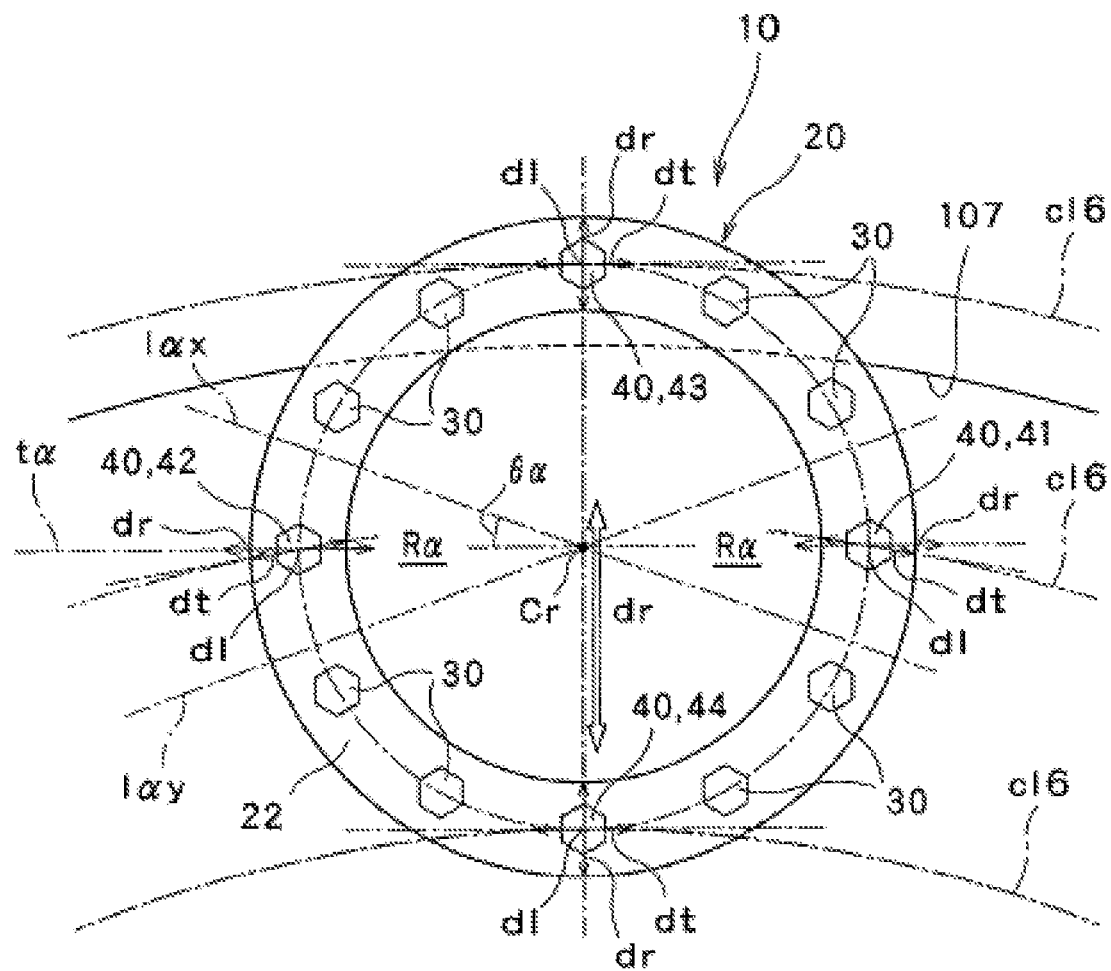
FIG. 6 is a plan view showing an arrangement of fasteners for mounting the one of the wind turbine driving devices shown in FIG. 4.

On the other hand, when the motor braking portion 50 brakes the drive shaft 48*a*, a supply of an electric current to the coil portion 53*b* is shut off to demagnetize the electromagnet 53, based on a command of the controller 110. When the electromagnet 53 is brought into a demagnetized state, the armature 57 is biased toward the friction plate 56 by an elastic force of the plurality of elastic members 55, and thus the armature 57 contacts with the friction plate 56. With this configuration, a friction force is generated between the armature 57 and the friction plate 56, and thus rotation of the drive shaft 48*a* is braked. FIG. 6 shows a state where the electromagnet 53 is demagnetized, in which rotation of the drive shaft 48*a* is braked.

Furthermore, in a state where the electromagnet 53 is demagnetized and thus the drive shaft 48*a* is braked, the friction plate 56 is in contact also with the friction plate 58 under a biasing force acting from the armature 57. Accordingly, when the electromagnet 53 is demagnetized, the friction plate 56 is sandwiched between the armature 57 and the friction plate 58 under a biasing force from the plurality of elastic members 55. With this configuration, rotation of the drive shaft 48*a* is braked by a friction force generated between the armature 57 and the friction plate 56 and a friction force generated between the friction plate 56 and the friction plate 58.

Figure 7:
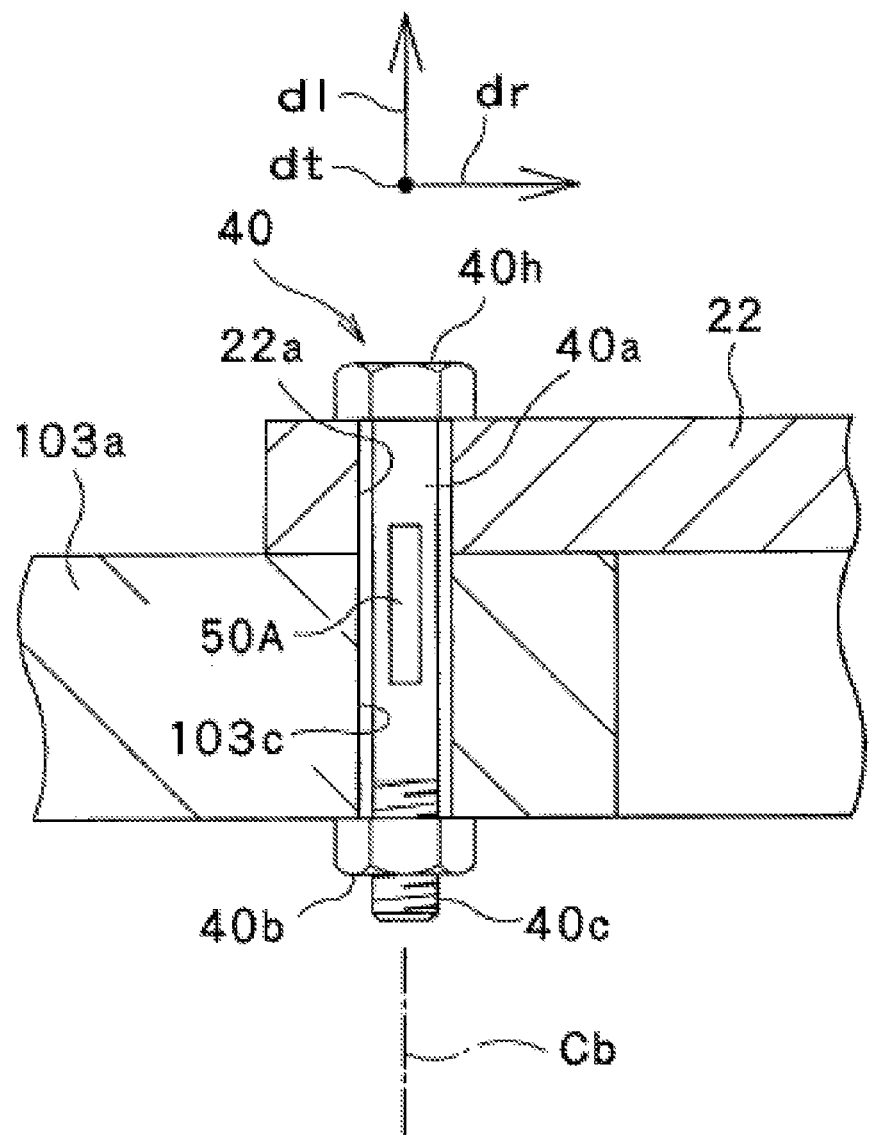
FIG. 7 is an enlarged view showing a sensor.

Next, the sensor 40 will now be described with reference to FIG. 7. In the outermost peripheral one of the through holes 22*a* of the driving device body 20, the sensor 40 is provided so as to reach into the through hole 103*c* of the nacelle 103. The sensor 40 is intended to sense a load acting between the driving device body 20 and the nacelle 103 and includes a sensing pin 40*a* having a head portion 40*h* and a nut 40*b* mounted to a screw portion 40*c* formed at a lower end portion of the sensing pin 40*a*.

In this case, the sensing pin 40*a* functions as a force receiving part for receiving a load acting on the sensing pin 40*a*. A strain gauge 50A for measuring a strain of the sensing pin 40*a* is provided on an outer surface of the sensing pin 40*a*. The strain gauge 50A is intended to sense a strain of the sensing pin 40*a* generated when a tensile force is applied to the sensing pin 40*a* and causes the sensing pin 40*a* to expand. In this case, when a plurality of strain gauges 50A are provided on the outer surface of the sensing pin 40*a*, as will be described later, loads applied to the sensing pin 40*a* in a radial direction, a circumferential direction, and an axial direction of the ring gear 107 can be sensed.

While having a configuration similar to that of the bolt 30*a* of the fastener 30, the sensing pin 40*a* of the sensor 40 has an outer diameter smaller than an outer diameter of the bolt 30*a*. Thus, even when loads acting on the sensing pin 40*a* and the bolt 30*a*, respectively, are of a similar magnitude, the sensing pin 40*a* experiences a larger strain than that of the bolt 30*a*, so that it is possible to increase sensitivity of the strain gauge SOA provided on an outer periphery of the sensing pin 40*a*.

Moreover, the sensing pin 40*a* of the sensor 40 can be formed from a material having an elastic modulus smaller than that of a material of the bolt 30*a*. For example, in a case where the bolt 30*a* is made of steel, the sensing pin 40*a* is formed from a material having an elastic modulus smaller than that of steel, such as, for example, steel, cast iron, or resin having an elastic modulus smaller than that of a material of the bolt 30*a* so that the sensing pin 40*a* experiences a larger strain, and thus it is possible to further increase sensitivity of the strain gauge SOA provided on the outer periphery of the sensing pin 40*a*.

Furthermore, preferably, the sensing pin 40*a* of the sensor 40 and the strain gauge SOA are made of a same material. With the sensing pin 40*a* and the strain gauge 50A being made of a same material such as, for example, a resin material, in a case where the sensor 40 is heated or cooled to cause the sensing pin 40*a* and the strain gauge 50A to expand or contract, expansion or contraction of the sensing pin 40*a* and the strain gauge 50A due to thermal expansion are cancelled out, and thus a load applied to the sensing pin 40*a* can be accurately sensed by the strain gauge 50A.

As mentioned above, the sensing pin 40*a* of the sensor 40 is fixed between the flange 22 of the driving device body 20 and the bottom portion 103*a* of the nacelle 103 by tightening the nut 40*b* mounted to the screw portion 40*c* at the lower end portion of the sensing pin 40*a*.

In this case, the nut 40*b* of the sensing pin 40*a* is loosely tightened. On the other hand, the bolt 30*a* of the fastener 30 is tightly tightened so as to firmly fix the driving device body 20 to the nacelle 103. Thus, an axial force of the sensing pin 40*a* becomes smaller than an axial force of the bolt 30*a*.

That is, in a case where the axial force (tensile force) of the sensing pin 40*a* is high beforehand, when a slight load (tensile force) is applied to the sensing pin 40*a*, it may be difficult to sense the load. In contrast, according to this embodiment, the axial force of the sensing pin 40*a* applied to the sensing pin 40*a* is set to be small beforehand, and this allows the sensing pin 40*a* to expand to be strained sensitively to an externally applied load, so that it is possible to sensitively sense a strain of the sensing pin 40*a*.

The strain gauge SOA of the sensor 40 is electrically connected to the controller 110. An electric signal related to a result of measurement outputted from the strain gauge SOA of the sensor 40 is transmitted to the controller 110, the sensor 40 being provided between each of the driving device bodies 20 and the nacelle 103. The controller 110 monitors an electric signal outputted from the strain gauge 50A of the sensor 40, and thus it becomes possible to grasp a change in load applied to the each of the driving device bodies 20. Based on the result of measurement by the strain gauge SOA of the sensor 40, the controller 110 controls the constituent elements of the wind turbine 101, such as the wind turbine driving devices 10.

Figure 12:
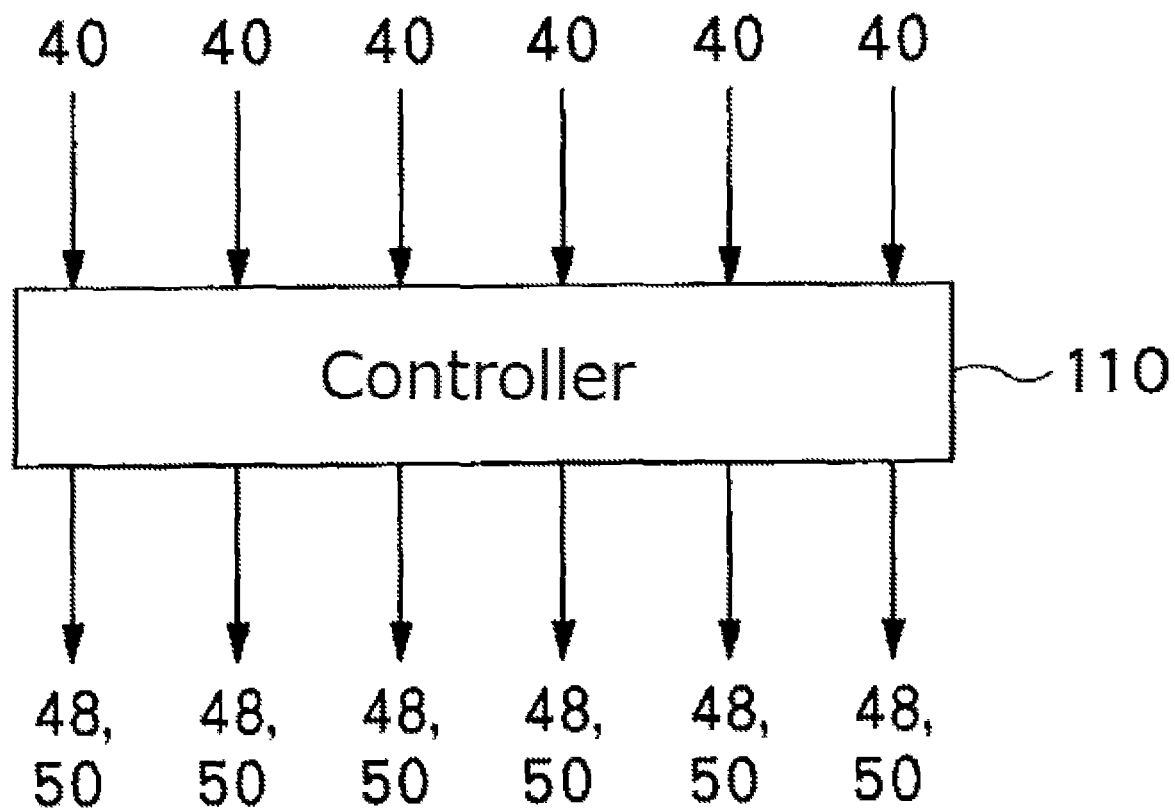
FIG. 12 is a block diagram for explaining a functional configuration of a controller.

FIG. 12 is a block diagram for explaining a functional configuration of the controller (load avoidance unit) 110. As shown in FIG. 12, the controller 110 receives a result of sensing from each of the sensors 40 provided in the plurality of driving devices 10 (in this example, six driving devices 10). That is, the sensors 40 in the driving devices 10 are connected to the controller 110. The controller 110 is capable of outputting a control signal for controlling the motor driving portion 48 and the motor braking portion 50 provided in each of the driving devices 10. There is no particular limitation on an installation position of the controller 110. The controller 110 may be provided integrally with any of the elements constituting the wind turbine 101 (such as, for example, the tower 102, the nacelle 103, the rotor 104, or the blades 105) or may be provided independently of these elements.

In a case where the sensor 40 of any one of the driving devices 10 has sensed an abnormality, the controller 110 stops the drive gear 24a of the driving device body 20 of the any one of the driving devices 10 from outputting a drive force to the ring gear 107. Typically, a drive force from the drive gear 24a can be stopped by shutting off, by the controller 110, power supply to the electric motor 23. An output from the drive gear 24a to the ring gear 107 is stopped in a state where an excessively large force is applied to a meshing portion between the drive gear 24a and the ring gear 107, and thus a further increase in load on the meshing portion can be avoided. Furthermore, in a case where breakage of the driving device body 20 due to aging degradation is expected based on an oil state, an output of a drive force from the driving device body 20 is stopped, and thus it becomes possible to effectively avoid breakage of the ring gear 107 connected to the driving device body 20 and an area surrounding the ring gear 107. Furthermore, in a case where a malfunction of the motor braking portion 50 is identified, it becomes possible to effectively avoid further breakage of the driving device body 20 and breakage of the ring gear 107 connected to the driving device body 20 and the area surrounding the ring gear 107.

Furthermore, in a case where the sensor 40 of any one of the driving devices 10 has sensed an abnormality, the controller 110 releases braking of rotation by the braking mechanism (motor braking portion 50) of the any one of the driving devices 10. That is, in a case where the sensor 40 has sensed an abnormality, the controller 110 transmits a control signal to release braking of rotation by the braking mechanism (motor braking portion 50). In the example shown, braking of rotation by the motor braking portion 50 can be released by supplying power, by the controller 110, to the motor braking portion 50. For example, in a case where an external force such as a wind gust is applied, when rotation of the drive gear 24a is restricted by a braking force of the braking mechanism, an extremely large load might be applied on the meshing portion between the drive gear 24a and the ring gear 107. For this reason, in a case where the sensor 40 of any one of the driving devices 10 has sensed an abnormality, braking of rotation by the braking mechanism (motor braking portion 50) of the any one of the driving devices 10 is released. Thus, it is possible not only to avoid an increase in load on the meshing portion but also to release a load generated at the meshing portion.

Moreover, in a case where the sensor 40 of one of the driving devices 10 has sensed an abnormality, in addition to stopping the drive gear 24a in the one of the driving devices 10 from outputting a drive force to the ring gear 107, the controller 110 also stops the drive gear 24a in each of the other driving devices 10 than the one of the driving devices 10 from outputting a drive force to the ring gear 107. In addition, in a case where the sensor 40 of one of the driving devices 10 has sensed an abnormality, in addition to releasing braking of rotation by the braking mechanism (motor braking portion 50) in the one of the driving devices 10, the controller 110 also releases braking of rotation by the braking mechanism in each of the other driving devices 10 than the one of the driving devices 10. In a case where a plurality of driving devices 10 are provided in one movable section as mentioned above, a drive force outputted from the drive gear 24a of one of the driving devices 10 to the ring gear 107 acts as an external force on the meshing portion between the drive gear 24a of each of the other driving devices 10 and the ring gear 107. Accordingly, in a case where an abnormality of any one of the driving devices 10 is found, there is avoided a phenomenon in which a drive force of one of the driving devices 10 is applied as an external force to the meshing portion between each of the other driving devices 10 and the ring gear 107, and a braking force by the braking mechanism of each of the driving devices 10 is released so that the each of the driving devices 10 can operate flexibly in accordance with an external force. With this configuration, it is possible to more effectively avoid damage to the driving device body 20 and damage to the ring gear 107 connected to the driving device body 20 and the area surrounding the ring gear 107.

In the movable section between the nacelle 103 and the tower 102, the drive gear 24a of each of the driving devices 10 is stopped from outputting a drive force to the ring gear 107, and braking of rotation by the braking mechanism 50 of the each of the driving devices 10 is released. This control is referred to as free yaw control. In the free yaw control, free relative rotation between the nacelle 103 (first structure) and the tower 102 (second structure) is permitted, and a braking force and a drive force that might inhibit the free relative rotation between the nacelle 103 and the tower 102 are reduced or cancelled. In a case where the motor driving portion 48 and the motor braking portion 50 as mentioned above are provided, the controller 110 shuts off energization with respect to the motor driving portion 48 so as to stop the drive shaft 48a from rotating and also controls energization with respect to the motor braking portion 50 so that a braking force is not applied from the motor braking portion 50 to the motor driving portion 48 (namely, the drive shaft 48a).

Furthermore, in a case where any other type of driving unit and any other type of braking unit are provided, the controller 110 controls the any other type of driving unit and the any other type of braking unit so as to eliminate a braking force and a drive force that might inhibit free relative rotation between the nacelle 103 and the tower 102. For example, in a case where a braking device (not shown), such as a caliper brake, for directly braking a rotational operation of the ring gear 107 is provided, the controller 110 controls the braking device so that a braking force is not applied from the braking device to the ring gear 107.

With the controller 110 performing the above-mentioned free yaw control, the drive gear 24a of each of the driving devices 10 and the ring gear 107 are placed in a freely rotatable state, and thus the nacelle 103 can freely rotate relative to the tower 102. Such free rotation can effectively prevent a load between each of the drive gears 24a and the ring gear 107 from becoming excessively large, and thus trouble such as breakage of the various elements constituting each of the driving devices 10 or the ring gear 107 can be avoided before it happens.

Next, an operation of the wind turbine driving devices 10 configured as above will now be described.

In the wind turbine 101 configured as above, when the movable section of the nacelle 103, the blades 105, and the like is rotated, the plurality of wind turbine driving devices 10 included in each of the wind turbine driving device units 5 are operated in a synchronized manner. With this configuration, the nacelle 103 and the blades 105, which are heavy objects, can be turned relative to the tower 102 and the rotor 104, respectively. Each of the wind turbine driving devices 10 operates based on a control signal sent from the controller 110.

As has already been described, in the movable section of the wind turbine 101, a malfunction might occur only in one or some of the wind turbine driving devices 10 included in each of the wind turbine driving device units 5, and the one or some of the wind turbine driving devices 10 might, therefore, be fixedly maintained in a stopped state. Moreover, due to a delay in sensing such an abnormality, the controller 110 might transmit a drive signal to each of the wind turbine driving devices 10 included in each of the wind turbine driving device units 5. At this time, the meshing portion 24a of a malfunctioning one of the wind turbine driving devices 10 meshes with the ring gear 107, and thus an operation of the movable section is restricted. Accordingly, when the meshing part 24a of each of the other normally functioning wind turbine driving devices 10 included in each of the wind turbine driving device units 5 operates, a large stress is generated between the meshing portion 24a of the each of the wind turbine driving devices 10 and the ring gear 107. That is, in a case where an abnormal state of any one of the wind turbine driving devices 10 is not promptly sensed, breakage occurs in the wind turbine driving devices 10 or the ring gear 107. In a case where damage has occurred to any one of the wind turbine driving devices 10, the any one of the wind turbine driving devices 10 is replaced, and thus the wind turbine 101 can be brought into operation again. On the other hand, in a case where breakage has occurred in the ring gear 107 or the area surrounding the ring gear 107 in the tower 102, large-scale repair work might be required, resulting in stopping an operation of the wind turbine 101 for a long period of time and thus leading to extensive loss.

To avoid such trouble, the wind turbine driving devices 10 each have the sensor 40 including the strain gauge SOA. The sensor 40 measures a change of each of the wind turbine driving devices 10 relative to one side of the movable section of the wind turbine 101, for example, a change in installation state of the driving device body 20 relative to the nacelle 103, specifically, a change in load applied to the driving device body 20. At this time, the sensor 40 measures an instantaneous change in load, for example, a change in load continuing for one second or less. The strain gauge SOA of the sensor 40 transmits, to the controller 110, an electric signal indicating a state of the fastener 30. The controller 110 monitors an electric signal transmitted from the sensor 40 and thus can sense an abnormality occurring in a corresponding one of the wind turbine driving devices 10. Upon sensing an abnormality, the controller 110 issues, for example, an alert indicating occurrence of the abnormality and also stops driving of the wind turbine driving devices 10. With this configuration, it is possible to avoid further damage to the wind turbine driving devices 10 or the ring gear 107. In this case, the controller 110 controls the motor braking portion 50 to brake the drive shaft 48a of the motor driving portion 48 or shuts off power supply to the electric motor 23, thus stopping driving of the wind turbine driving devices 10.

Particularly in this embodiment, a change in installation state of the driving device body 20 is measured. Our repeated simulations have identified the following tendency. That is, in a case where one of the plurality of wind turbine driving devices 10 malfunctions and thus is brought into a fixed state, and the other normally functioning wind turbine driving devices 10 are driven in this state, a large load is applied to the driving device body 20 of each of the wind turbine driving devices 10. This tendency agrees also with trouble that actually happens during operation of the wind turbine 101. In the first place, when the installation state of the driving device body 20 largely changes, a corresponding one of the wind turbine driving devices 10 moves relative to a wind turbine body, so that a mounting state of the corresponding one of the wind turbine driving devices 10 largely changes. At this time, a large load is applied to the wind turbine driving devices 10, the ring gear 107, or structures surrounding the ring gear 107. Accordingly, through the use of the sensor 40 for measuring a change in installation state of the driving device body 20, it is possible to promptly and accurately sense an abnormal state of any one of the wind turbine driving devices 10.

Preferably, the sensor 40 described above measures at least one of a change in state of the sensing pin 40a in a tangential direction dt relative to a circumference cl6 about the center axis Cm of the ring gear 107, a change in state of the sensing pin 40a in a radial direction dr about the center axis Cm of the ring gear 107, and a change in state of the sensing pin 40a in the axial direction dl parallel to the center axis Cm of the ring gear 107. Based on a relative movement between the meshing portion 24a of each of the wind turbine driving devices 10 and the ring gear 107, the largest change in state of the sensing pin 40a is likely to occur in any one of the tangential direction dt, the radial direction dr, and the axial direction dl. Accordingly, with the sensor 40 sensing any one or more of a change in state of the sensing pin 40a in the tangential direction dt, a change in state of the sensing pin 40a in the radial direction dr, and a change in state of the sensing pin 40a in the axial direction dl, it becomes possible to more promptly and more accurately sense an abnormal state of a corresponding one of the wind turbine driving devices 10. Moreover, with the sensor 40 sensing all of a change in state of the sensing pin 40a in the tangential direction dt, a change in state of the sensing pin 40a in the radial direction dr, and a change in state of the sensing pin 40a in the axial direction dl, it becomes possible to extremely promptly and extremely accurately sense an abnormal state of a corresponding one of the wind turbine driving devices 10.

Furthermore, in a case where the sensing pin 40a has a longitudinal axis Cb as in a bolt, for example, the sensing pin 40a is likely to largely change in state in a direction parallel to the longitudinal axis Cb or a direction orthogonal to the longitudinal axis Cb. Accordingly, when consideration is given to a shape of the sensing pin 40a, preferably, the sensor 40 measures at least one of a change in a state of the sensing pin 40a in the direction parallel to the longitudinal axis Cb of the sensing pin 40a and a change in state of the fastener 30 in the direction orthogonal to the longitudinal axis Cb of the sensing pin 40a.

In the example shown in FIG. 5 and FIG. 6, the longitudinal axis Cb of the sensing pin 40a is parallel to the rotation axis Cr of each of the wind turbine driving devices 10 and the center axis Cm of the ring gear 107. That is, the longitudinal axis Cb of the sensing pin 40a is parallel to the above-mentioned axial direction dl and orthogonal to the above-mentioned tangential direction dt and the above-mentioned radial direction dr. In the above example shown, the sensing pin 40a is extremely likely to change in state in the tangential direction dt, the radial direction dr, or the axial direction dl, in other words, in the direction parallel or orthogonal to the longitudinal axis Cb of the sensing pin 40a. Accordingly, with the sensor 40 sensing a change in state of the sensing pin 40a in these directions, it becomes possible to extremely promptly and extremely accurately sense an abnormal state of a corresponding one of the wind turbine driving devices 10.

Furthermore, in this embodiment, as shown in FIG. 6, the driving device body 20 of each of the wind turbine driving devices 10 includes the case 21 having the flange 22, the fastener 30 penetrating through the flange 22, and the output shaft 24 having the meshing portion 24a and supported to the case 21. Eight fasteners 30 are arranged in a circle about an axis of the output shaft 24, namely, a circle about the rotation axis Cr of each of the wind turbine driving devices 10. Further, the sensors 40 are provided so as to be spaced 90° apart from each other at appropriate locations other than locations at which the fasteners 30 are arranged. Furthermore, it becomes possible to more accurately grasp, based on a result of measurement by each of the sensors 40, a change in installation state of the driving device body 20 relative to the nacelle 103 and also a change in mounting state of each of the wind turbine driving devices 10. As a result, it becomes possible to extremely promptly and extremely accurately sense an abnormal state of any one of the wind turbine driving devices 10.

In the example shown in FIG. 6, a first sensor 41 is provided at a position nearest to one side along the circumference cl6 about the center axis Cm of the ring gear 107. Furthermore, a second sensor 42 is provided at a position nearest to the other side along the circumference cl6 about the center axis Cm of the ring gear 107. Moreover, a third sensor 43 is provided at a position farthest from the center axis Cm along the radial direction dr about the center axis Cm of the ring gear 107, and a fourth sensor 44 is provided at a position closest to the center axis Cm along the radial direction dr about the center axis Cm of the ring gear 107. In each of the wind turbine driving devices 10 described above, the separate first to fourth sensors 41, 42, 43, and 44 are used at locations likely to receive largest loads, respectively, and thus it is possible to independently and accurately measure a change in state. Accordingly, it becomes possible to extremely promptly and extremely accurately sense an abnormal state of any one of the wind turbine driving devices 10.

More preferably, a change in installation state of the driving device body 20 at a location in an area $R\alpha$ in which a meshing pressure angle $\theta\alpha$ is within a predetermined angle range, for example, the area $R\alpha$ in which the meshing pressure angle $\theta\alpha$ is within a range of $\pm 20°$ is sensed by the sensor 40. Still more preferably, a change in installation state of the driving device body 20 at a location in the area $R\alpha$ in which the meshing pressure angle $\theta\alpha$ is within a range of $\pm 10°$ is sensed by the sensor 40. Most preferably, a change in installation state of the driving device body 20 at a location at which the meshing pressure angle $\theta\alpha$ is $0°$ is sensed by the sensor 40. It could be confirmed, from a simulation result, that the driving device body 20 was likely to change in installation state at the location in the area $R\alpha$ in which the meshing pressure angle $\theta\alpha$ was within a range of $\pm 20°$, was likely to significantly change in installation state at the location in the area $R\alpha$ in which the meshing pressure angle $\theta\alpha$ was within a range of $\pm 10°$, and was likely to most largely change in installation state at the location at which the meshing pressure angle $\theta\alpha$ was $0°$. In a plane orthogonal to the rotation axis Cr of the output shaft 24 of each of the wind turbine driving devices 10 shown in FIG. 6, an angle of a straight line passing through the rotation axis Cr with respect to a tangent line to at the rotation axis Cr to a circumference about the center axis Cm of the ring gear 107, the circumference passing through the rotation axis Cr of the output shaft 24, is referred to as the meshing pressure angle $\theta\alpha$. In the example shown in FIG. 6, the area $R\alpha$ enclosed by a straight line lax and a straight line lay is the area $R\alpha$ in which the meshing pressure angle $\theta\alpha$ is within a range of $\pm 20°$. In the area $R\alpha$ in which the meshing pressure angle $\theta\alpha$ is within a range of $\pm 20°$, the above-mentioned third sensor 43 and the fourth sensor 44 are positioned.

Moreover, it may be determined whether or not any one of the wind turbine driving devices 10 is in an abnormal state based on a result of comparing changes in installation state sensed by the plurality of sensors 40. In particular, it may be determined whether or not any one of the wind turbine driving devices 10 is in an abnormal state based on a result of comparing changes in state sensed by two or more sensors 40 disposed at symmetrical positions about the rotation axis Cr of the output shaft 24 of the any one of the wind turbine driving devices 10. In this case, it becomes possible to extremely promptly and extremely accurately sense an abnormal state of any one of the wind turbine driving devices 10.

As described thus far, in this embodiment, each of the wind turbine driving devices 10 includes the driving device body 20 installed in one structure and including the meshing portion 24a meshing with the ring gear 107 installed in the other structure, the one structure and the other structure being provided at the movable section of the wind turbine 101, and the sensor 40 for measuring a change in installation state of the driving device body 20. According to the wind turbine driving devices 10 described above, it is possible to promptly and accurately sense an abnormal state of any one of the wind turbine driving devices 10.

While the foregoing has described the present invention based on one embodiment shown in the drawings, the present invention is not limited thereto and can be implemented in various other modes.

For example, in the above description of the embodiment, the pair of wind turbine driving device units 5 are provided in the movable section in which the nacelle 103 is rotated relative to the tower 102, and each of the wind turbine driving device units 5 includes three wind turbine driving devices 10. However, there is no limitation to this example, and only one wind turbine driving device unit 5 or three or more wind turbine driving device units 5 may be provided in the movable section of the wind turbine 101. Furthermore, each of the wind turbine driving device units 5 may include two wind turbine driving devices 10 or four or more wind turbine driving devices 10.

Modification Examples

Figure 8:
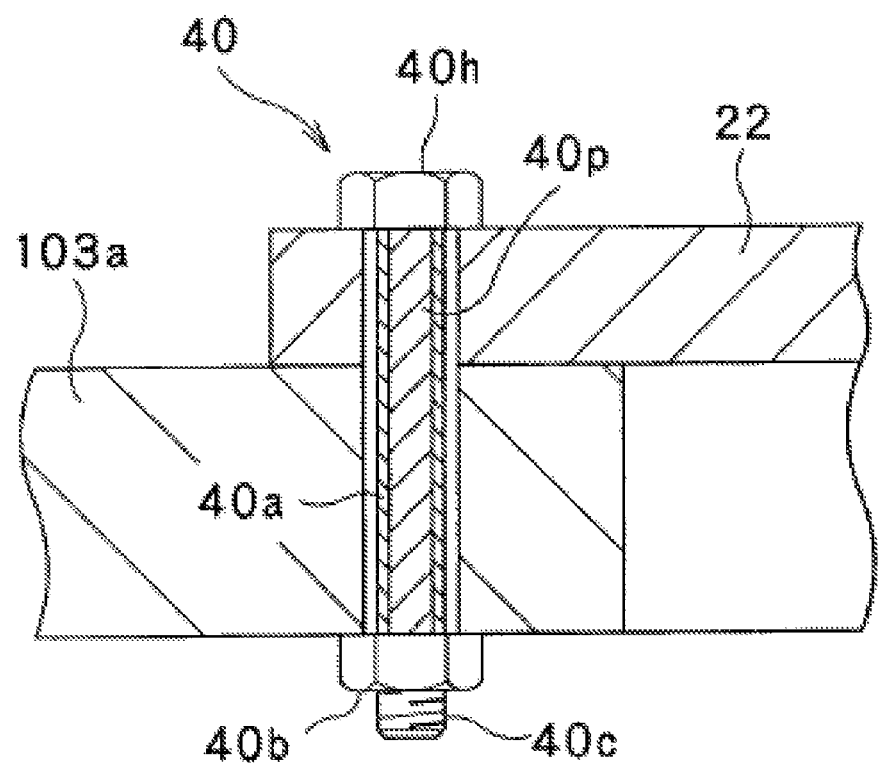
FIG. 8 is a view showing a modification example of the sensor.

Next, modification examples of the present invention will now be described. While the foregoing embodiment shows an example in which the sensor 40 includes the bolt-shaped sensing pin 40a having the head portion 40h and the strain gauge SOA provided on the outer surface of the sensing pin 40a, there is no limitation thereto. As shown in FIG. 8, the sensor 40 may include a hollow sensing pin 40a having a head portion 40h and a through hole, a press-fitting pin 40p press-fitted in the hollow sensing pin 40a, and a strain gauge SOA provided on an outer surface of the sensing pin 40a. A nut 40b is mounted to a screw portion 40c of the hollow sensing pin 40a. In FIG. 8, the strain gauge SOA is not shown Alternatively, as shown in FIG. 9, the sensor 40 may include a sensing pin 40a having a flange 40f1 provided at the top thereof and a flange 40f2 provided at the bottom thereof and a strain gauge SOA provided on an outer periphery of the sensing pin 40a.

Figure 9:
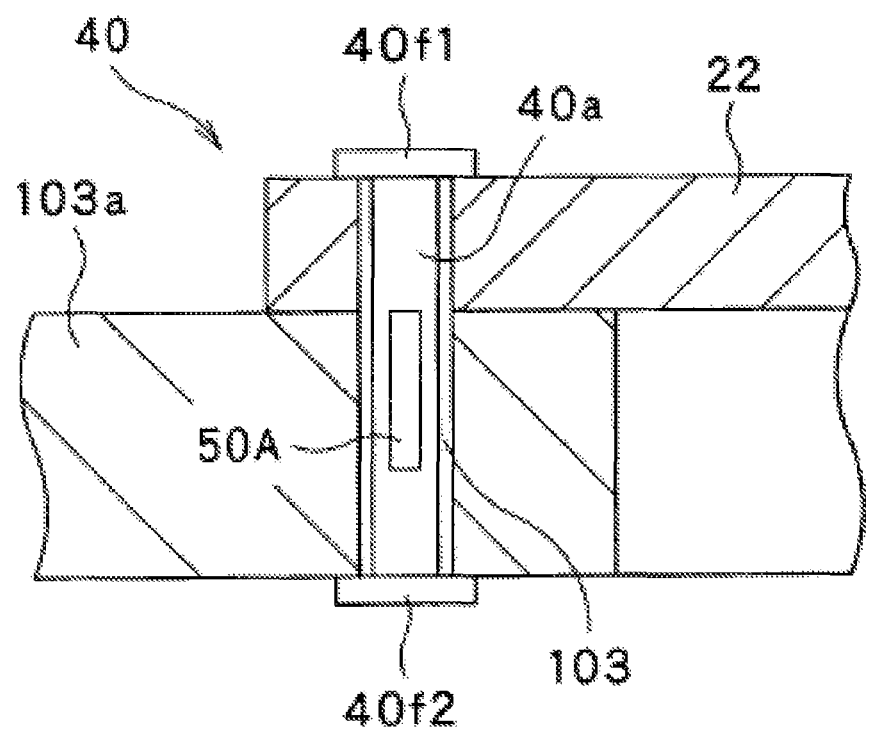
FIG. 9 is a view showing another modification example of the sensor.

In a modification example shown in FIG. 9, the flanges 40/1 and 40/2 of the sensing pin 40a are both fixed, by welding, to the driving device body 20 and the bottom portion 103a of the nacelle 103, respectively.

Figure 10:
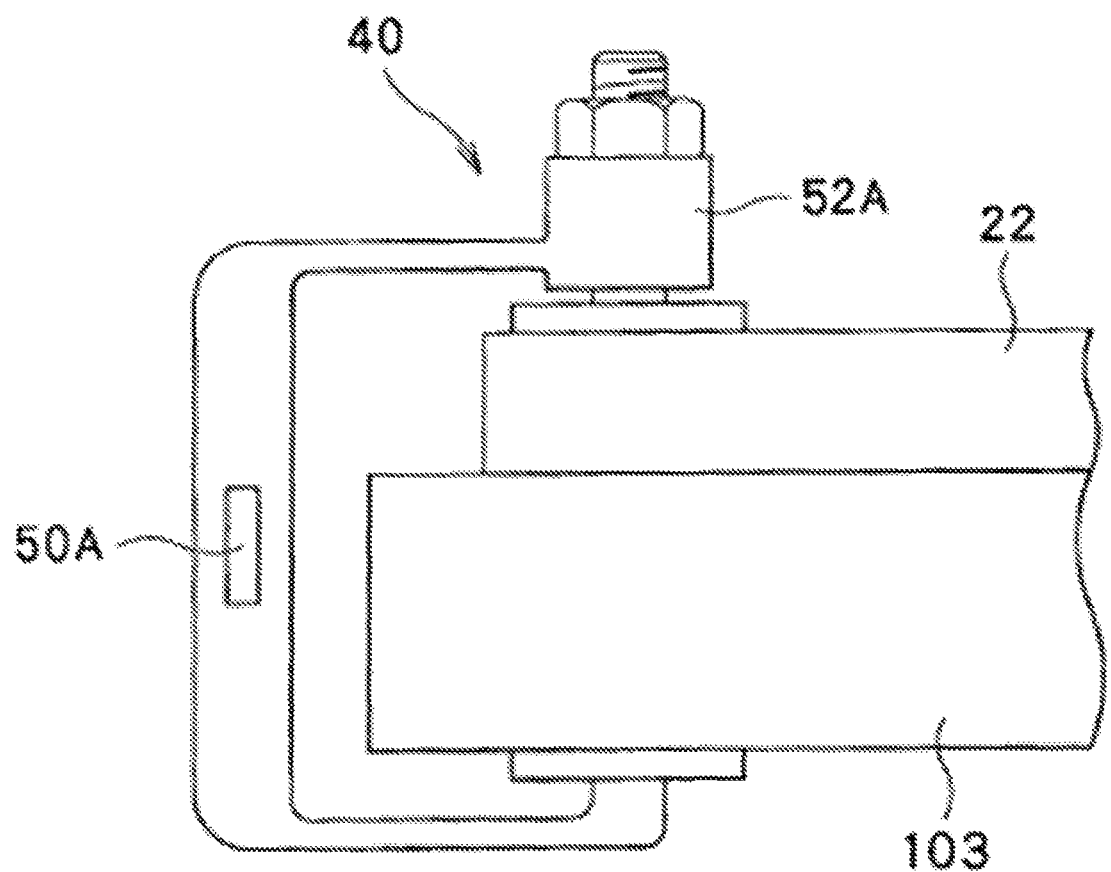
FIG. 10 is a view showing yet another modification example of the sensor.

Alternatively, as shown in FIG. 10, the driving device body 20 and the bottom portion 103a of the nacelle 103 are held in a sandwiched manner by a clamp 52A, and a strain gauge 50A is mounted to the clamp 52A.

In FIG. 10, the clamp 52A functions as a power receiving part for receiving a load, and the strain gauge SOA mounted to the clamp 52A functions as a sensing portion. The clamp 52A and the strain gauge SOA constitute the sensor 40.

As another example, it is also possible that a mounting plate (not shown) is mounted by welding between the driving device body 20 and the bottom portion 103a of the nacelle 103, and a strain gauge is mounted to the mounting plate.

Alternatively, it is also possible that a strain gauge is directly attached to outer surfaces of the driving device body 20 and the bottom portion 103a of the nacelle 103, and a load acting on the driving device body 20 is sensed by the strain gauge. In this case, a load acting on the driving device body 20 may be directly sensed by the strain gauge.

Moreover, while the foregoing one embodiment shows an example in which upon the sensor 40 sensing an abnormality, braking of rotation by the braking mechanism 50 is released, there is no limitation thereto. It is also possible that upon the sensor 40 sensing an abnormality, interlocking between a constituent element whose rotation is braked by the braking mechanism 50 and the drive gear 24a is released. Specifically, in the foregoing one embodiment, it is possible that a clutch mechanism 85 (see FIG. 4) is provided between the drive shaft 48a whose rotation is braked by the motor braking portion 50 and the drive gear 24a, and upon sensing of an abnormality, interlocking between the drive shaft 48a and the drive gear 24a is interrupted. The modification examples described above can also achieve the same technical effects as in the foregoing one embodiment.

LIST OF REFERENCE NUMBERS 5 wind turbine driving device unit
10 wind turbine driving device
20 driving device body
21 case
22 flange
22a through hole
23 electric motor
24 output shaft
24a meshing portion
25 connection portion
30 fastener
30a bolt
30b nut
31 first fastener
second fastener
33 third fastener
34 fourth fastener
40 sensor
40a sensing pin
40b nut
40c screw portion
40/1 flange
40/2 flange
41 first sensor
42 second sensor
43 third sensor
44 fourth sensor
50 motor braking portion
50A strain gauge
52A clamp
85 clutch mechanism
101 wind turbine
102 tower
103 nacelle
103a bottom portion
103b through hole
104 rotor
105 blade
106 bearing
107 ring gear
110 controller
Cm center axis
Cb axis
Cr rotation axis
Cl1 circumference
Cl6 circumference
dt tangential direction
dr radial direction
dl axial direction

What is claimed is:

1. A wind turbine driving device, comprising:
a driving device body installed in one structure at a movable section of a wind turbine, the driving device body including a mesh portion configured to mesh with a ring gear installed in another structure at the movable section of the wind turbine; and
a sensor configured to measure a load acting between the driving device body and the one structure,
wherein the driving device body is fixed to the one structure with a fastening bolt, and
wherein the sensor includes:
an elongated member having a first end and an opposing second end, the elongated member configured to receive a load acting on the driving device body; and
a strain gauge configured to measure a strain of the elongated member, the strain gauge being provided on the elongated member,
wherein the elongated member is configured to be connected to the device driving body at the first end and to the one structure at the opposing second end to fix the driving device body to the one structure with an axial force that is smaller than that of the fastening bolt.

2. The wind turbine driving device according to claim 1, further comprising a load avoidance unit configured to stop an operation of the driving device body based on a signal from the sensor.

3. The wind turbine driving device according to claim 1, wherein the sensor is configured to measure an instantaneous change in load.

4. The wind turbine driving device according to claim 1, wherein the elongated member is formed of a sensor pin that is smaller in diameter than the fastening bolt.

5. The wind turbine driving device according to claim 1, wherein the elongated member is made of a material having an elastic modulus that is smaller than that of a material of the fastening bolt.

6. The wind turbine driving device according to claim 1, wherein the elongated member is formed of a mounting plate extending between the driving device body and the one structure.

7. The wind turbine driving device according to claim 1,
wherein the elongated member is formed of a sensor pin, and
wherein the sensor pin is bolt-fastened to the driving device body and the one structure.

8. The wind turbine driving device according to claim 1,
wherein the elongated member is fixed to the driving device body and the one structure by welding.

9. The wind turbine driving device according to claim 1,
wherein the elongated member is formed of a sensor pin provided in a shaft, the shaft extending between the driving device body and the one structure and having a hole.

10. The wind turbine driving device according to claim 1,
wherein the elongated member is formed of a clamp for clamping together the driving device body and the one structure.

11. The wind turbine driving device according to claim 1,
wherein the strain gauge is attached to the driving device body and the one structure.

12. A wind turbine driving device unit, comprising a plurality of wind turbine driving devices provided in one movable section of a wind turbine,
wherein each of the plurality of wind turbine driving devices is formed of the wind turbine driving device according to claim 1, and
wherein each of the plurality of wind turbine driving devices separately includes the sensor for measuring a load acting between the driving device body and the one structure.

13. A wind turbine, comprising: the wind turbine driving device according to claim 1.

14. A wind turbine comprising the wind turbine driving device unit according to claim 12.

* * * * *